(12) United States Patent
Reitze

(10) Patent No.: US 6,428,096 B2
(45) Date of Patent: Aug. 6, 2002

(54) CAR SEAT WITH LIGHTING

(75) Inventor: Achim Reitze, Kassel (DE)

(73) Assignee: Faurecia Autositze GmbH & Co. KG, Stradthagem (DE)

( * ) Notice: Subject to any disclaimer, the term of this patent is extended or adjusted under 35 U.S.C. 154(b) by 0 days.

(21) Appl. No.: 09/725,062

(22) Filed: Nov. 29, 2000

(30) Foreign Application Priority Data

Nov. 29, 1999 (DE) .......................................... 199 57 448

(51) Int. Cl.⁷ ................................................. A47C 7/72
(52) U.S. Cl. ................................ 297/217.6; 291/188.04
(58) Field of Search ........................ 297/217.1, 217.3, 297/217.6, 188.04, 185

(56) References Cited

U.S. PATENT DOCUMENTS

| | | | | |
|---|---|---|---|---|
| 1,704,415 A | * | 3/1929 | Wenegrat | 297/217.6 |
| 3,019,050 A | * | 1/1962 | Spielman | 297/188.04 X |
| 4,702,519 A | * | 10/1987 | Lobanott | 297/185 |
| 5,507,556 A | * | 4/1996 | Dixon | 297/188.04 X |

* cited by examiner

Primary Examiner—Peter R. Brown
(74) Attorney, Agent, or Firm—Connolly Bove Lodge & Hutz, LLP

(57) ABSTRACT

A car seat provided with a seat part and a backrest having lighting arranged on the rear side of the backrest whose light is aimed at least essentially downward.

7 Claims, 1 Drawing Sheet

CAR SEAT WITH LIGHTING

FIELD OF THE INVENTION

The invention relates to a car seat having a seat part and a backrest. More specifically, lighting is arranged on the rear side of the backrest.

BACKGROUND OF THE INVENTION

It is known that in order to illuminate the inner part of a car or the inner part areas, lighting can be deployed on the roof of the car body or in the upper area of the B or C column of the car body. Similar types of lighting are suitable for illumination of the entire inner space. However, this type of lighting cannot be used while the car is traveling because it can have an influence on the ability of the driver to see.

Pilot lights are also known that are designed to be inserted in a connector provided in the ashtray, which is normally used for insertion of a cigarette lighter. As long as the ashtrays for the passengers in the rear are also equipped with similar connectors, a similar type of lighting can be also used for the purposes of temporary lighting in the rear seat area. These lights, however, are not suitable for regular illumination because they are not built in permanently.

In addition, it is also known that entrance lights are installed in the doors of automobiles, which illuminate the floor near an opened door, and sometimes also the doorstep, when the door is opened.

SUMMARY OF THE INVENTION

Based on this status of prior art, the task of this invention to provide a lighting arrangement which enables the universal utilization of a single lighting unit for different applications.

The solution of this task is provided in accordance with the characteristics disclosed in patent claim 1.

The proposed lighting is thus suitable both for illumination of the rear area of the inner space, as well as for a reading lamp of the passengers in the rear. At the same time, the light, which is turned downward, will not significantly influence the visibility of the driver. In four-door automobiles, the entrance area of the rear doors can be illuminated with lights arranged in the backrest of the front seat. When the backrest is folded forward, the entry area of the driver or passenger door and of the space for feet in the passage region can be illuminated for the rear passengers.

A preferred embodiment of the invention will be further described based on the subordinated claims.

In a preferred embodiment of the invention, the light can be aimed when the lighting is tilted.

A tilting or turning movement can be also used in order to turn the lights on and off. The lights can be also mounted in the backrest of the seat so that the tilting or turning position is fully accommodated in the backrest of the seat.

BRIEF DESCRIPTION OF THE DRAWINGS

The following is a detailed description of an embodiment of this invention based on the enclosed figures.

DETAILED DESCRIPTION OF THE INVENTION

Figure 1:
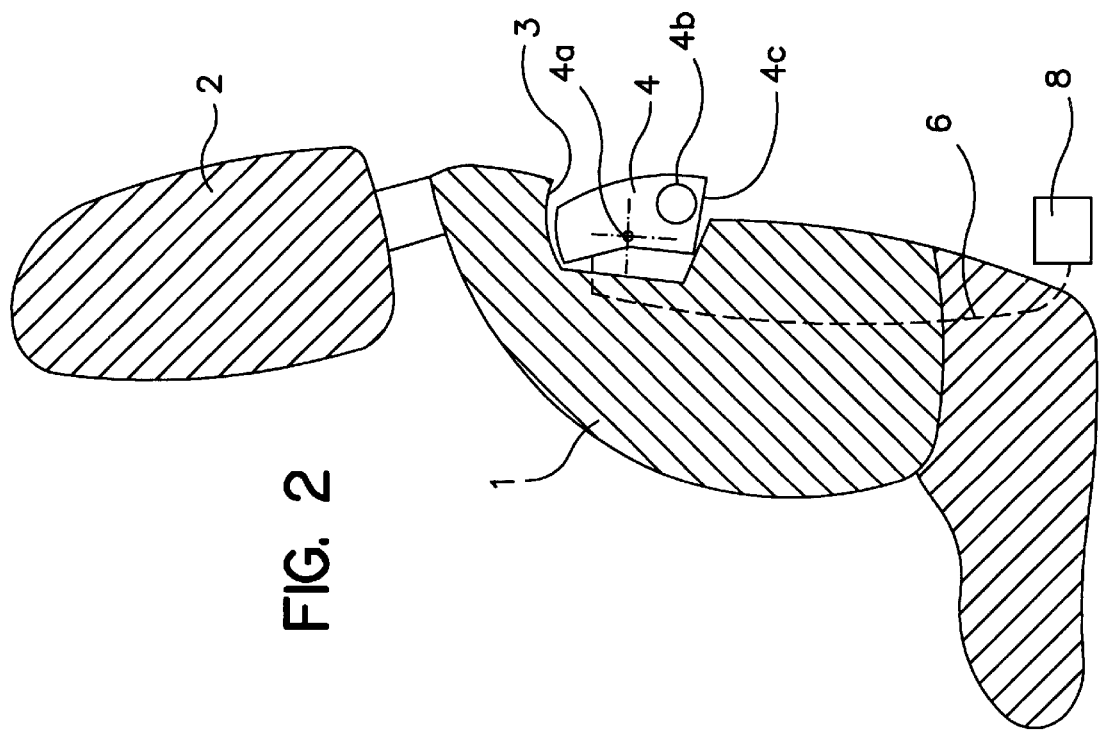
FIG. 1—a longitudinal cross section of the upper area of the backrest of the seat provided with a light submerged in the backrest of the seat.
Figure 2:
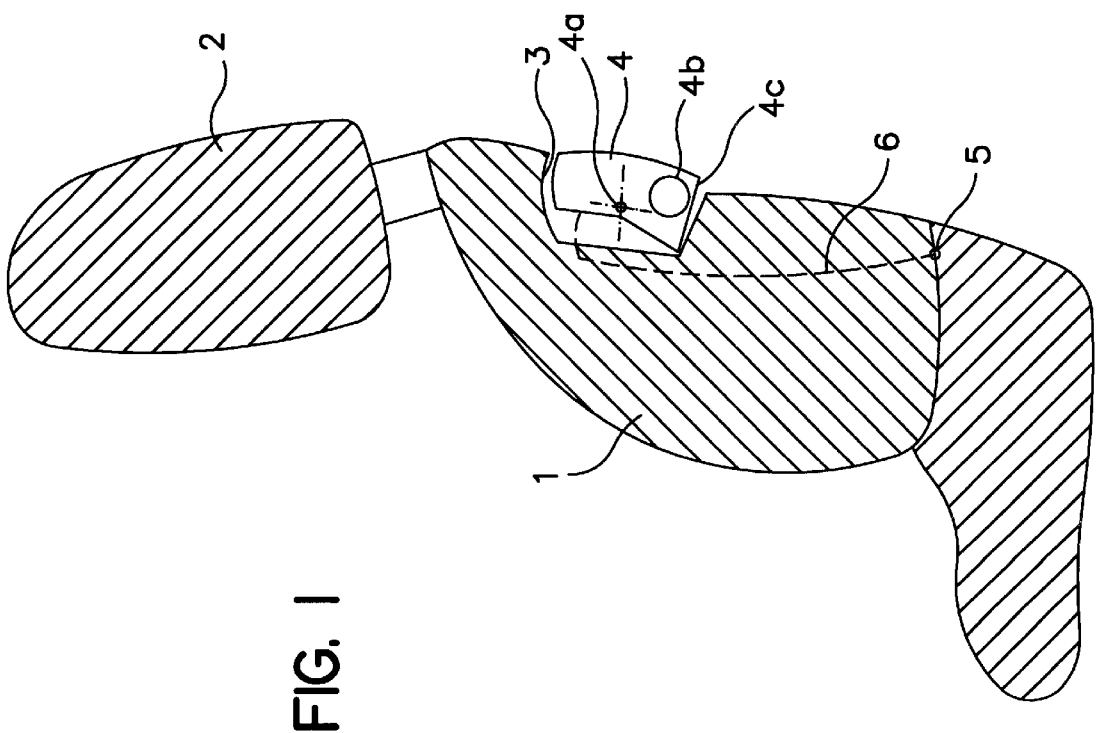
FIG. 2—a longitudinal cross section according to FIG. 1 with a light swung out into the reading position.

The backrest 1 of an automobile seat holds a head support 2. A recess 3 is provided in the rear of the backrest, while lighting 4 is arranged in this recess. This lighting 4 is rotatable around horizontal axle 4a, which is stored in the backrest 1. Lighting 4 is equipped with lighting means 4b, which is symbolized in the drawing with a circle. This lighting means 4b emits light through a light outlet opening 4c provided on the rear side of the lighting.

When lighting 4 is fully rotated out of recess 3, it can serve as lighting for the inner room area for passengers in the rear, and it can be also used for illumination of the entrance area of the doors located next to it. When backrest 1 is swung forward, lighting 4 will emit light into the area providing access to the rear seats and into the entry area next the to front door on each side. Lighting 4 can be also utilized as a reading lamp when the light is aimed downward while the automobile is moving. When lighting 4 is partially swung back into backrest 1, this will reduce the light outlet opening 4c, making it possible to adjust the brightness of the reading light in accordance with requirements.

The light can be switched on and off through a rotating movement of the lighting. It goes without saying that in addition to a rotating movement of the lighting unit, the lighting can be operated also with a customary electric switch and also for example with door contacts.

What is claimed is:

1. A car seat with a backrest comprising: a lighting unit positioned in a rear side of the backrest and having a light source proximate to a light outlet opening at a bottom surface of the light unit, wherein light from the lighting source projects downward through the light outlet opening.

2. A car seat according to claim 1, wherein the light source is switched on and off by a door contact.

3. A car seat according to claim 1, wherein the light source is switched on and off depending on a folding position of the backrest.

4. A car seat according to claim 1, wherein the lighting unit is rotatable about a horizontal axis positioned above the light source.

5. A car seat according to claim 4, wherein the light source is switched on and off by rotation about the horizontal axis.

6. A car seat according to claim 1, wherein the lighting unit is arranged in a recess of the backrest.

7. A car seat according to claim 6, wherein the light projecting downward is adjusted by directing a portion of the light into the recess.

* * * * *